United States Patent

[11] 3,602,598

[72] Inventor Gerard Boitel, Paris;
 Albert Petitpas, Rombas, both of France
[21] Appl. No. 795,004
[22] Filed Jan. 29, 1969
[45] Patented Aug. 31, 1971
[73] Assignees Societe De Constructions
 Electromecaniques Jeumont-Schneider
 Paris, France;
 Union Siderurgique Lorraine "Sidelor"
 Moselle, France
[32] Priority Jan. 30, 1968, Jan. 20, 1969
[33] France
[31] 137878 and 6900934

[54] METHOD AND APPARATUS FOR ACCURATELY MEASURING THE SIZE OF A MOVING OBJECT IN THE DIRECTION OF, AND DURING ITS MOVEMENT
3 Claims, 4 Drawing Figs.

[52] U.S. Cl. .................................................... 356/167,
 250/219 LG
[51] Int. Cl. ...................................................... G01b 11/04
[50] Field of Search .......................................... 356/167,
 158; 250/219 LG; 83/72, 76, 364

[56] References Cited
UNITED STATES PATENTS
3,396,278  8/1968  Bo Hjorth .................... 250/219
3,163,065  12/1964  Kolodgy et al. ............... 83/72

FOREIGN PATENTS
1,018,223  1/1966  Great Britain ................ G/08 C

Primary Examiner—Ronald L. Wibert
Assistant Examiner—J. Rothenberg
Attorney—Raymond A. Robic ABSTRACT: A method and an apparatus for accurately measuring the size of a solid or semisolid moving object, in the direction of, and during its movement. The method and the apparatus are characterized by the measurement of the time taken by the front and rear ends of the object to pass opposite two groups of points determined by its travel, one upstream group of close set points and one downstream group of widely spaced points, such points being positioned so that the distance between the end points of the upstream group corresponds to the largest interval separating two consecutive points of the downstream group, and so that, when the front of the object passes in front of one of the points of the downstream group, the rear of the object simultaneously passes in front of one of the points of the upstream group. The method and the apparatus are characterized in the second place by the measurement of the speeds at which the object passes in front of the above mentioned points and of the corresponding accelerations. The method and the apparatus are characterized in the third place by the measurement of the temperatures of the object at different points of its travel. Finally, the method and the apparatus are characterized by the introduction of the preceding measured values into a computer device which displays at its output the size of the object for a given temperature.

METHOD AND APPARATUS FOR ACCURATELY MEASURING THE SIZE OF A MOVING OBJECT IN THE DIRECTION OF, AND DURING ITS MOVEMENT

The present invention relates to a method and apparatus for accurately measuring the size of a moving object in the direction of, and during its movement.

In many industries the precise size of a product must be known at a particular temperature. More particularly, this knowledge enables a product to be cut up economically and avoids the loss of materials which can be recovered only to a small extent, if at all. This applies, for instance, to products leaving rolling mills, which must have a given length after cooling at ambient temperature. If cutting is correctly performed, it can also reduce the stock of surplus products and thus represents a saving in operations.

Methods and apparatuses are known which are based on the counting of pulses set up by a generator connected to a cylinder whose rotary movement is bound up with the movement of the product, for instance, simply by mechanical contact. These methods and apparatuses are not very accurate because of the slip which may occur between the product and the cylindrical object in contact therewith. This slipping is considerable and dangerous, inter alia in rolling mills.

Other prior art apparatuses use banks of detectors disposed above the moving product, but these apparatuses ignore the change in speed of the product during measurement—i.e., any possible accelerations or decelerations. Nor do these apparatuses make any correction to allow for variations in size of the product in relation to its temperature.

These disadvantages are obviated by the method and apparatus according to the invention for measuring the size of a moving object in the direction of, and during its movement. During measurement, the speed of movement of the moving object can vary considerably, and its mean temperature can so change that a correction taking into account these two parameters may be required to assess correctly the size of the object for a given reference temperature, for instance, ambient temperature. The method and apparatus according to the invention take these two parameters into account.

The method according to the invention for measuring the size of a solid or semisolid moving object in the direction of, and during its movement is characterized by the measurement of the time taken by the front and rear ends of the object to pass opposite two groups of points determined by its travel—i.e., one upstream group of close set points and one downstream group of widely spaced points, so that the distance between the end points of the upstream group corresponds to the largest interval separating two consecutive points of the downstream group, and when the front of the object passes in front of one of the points of the downstream group, the rear of the object simultaneously passes in front of one of the points of the upstream group; the method being characterized in the second place by the measurement of the temperatures of the object at different points of its travel, if a correction of the measurement is required in relation to temperature, and the method being characterized in the third place by the introduction of the preceding measured values into a computer device which calculates the mean speeds at which the rear end of the object passes in front of the close set points from the known values of distances between the said points and from the aforesaid measured times, which also calculates the corresponding accelerations from the average speeds between two consecutive intervals of close set points, and which displays at its output the size of the said object for a given temperature.

The apparatus according to the invention for use in the method described hereinbefore comprises in the first place two groups of detectors placed along the travel of the moving object; one group of detectors, which are disposed upstream in relation to the direction of movement of the object, can be referred to as fine detectors, the other detectors, which are disposed downstream in relation to the direction of movement of the object, being called rough detectors.

The upstream group comprises detectors disposed along the travel followed by the object, at small distances from one another in relation to the spacing between the successive detectors of the downstream group, so that the sum of the intervals between the detectors of the upstream group corresponds to the largest interval separating two consecutive detectors of the downstream group.

If reference is made to the direction of movement of the object, the distance between the last detector of the upstream group and the first detector of the downstream group is so selected as to be smaller than the minimum size of the objects to be measured in the direction of their movement, while the distance between the first detector of the upstream group and the last detector of the downstream group is greater than the maximum size of the objects.

The apparatus according to the invention comprises in the second place a storage device recording the times taken by the front end of the article to pass in front of each of the detectors of the downstream group, and the times taken by the rear end of the object to pass in front of each of the detectors of the upstream group.

The apparatus according to the invention comprises in the third place a computer determining the means speeds of the object in the spaces between two consecutive detectors of the upstream group, and then the momentary speeds of passage at the detectors of the upstream group, and the variations in speed in algebraic values (accelerations or decelerations).

Lastly, the apparatus comprises temperature indicators enabling inter alia the mean temperature of the article and its variation during measurement to be registered, such information being introduced into the computer so that the latter can make the necessary corrections so as to display at its output the measured size of the object at a given temperature.

An embodiment of the invention, relating to a bar rolling mill, will now be described with reference to the drawings, wherein.

Figure 1:
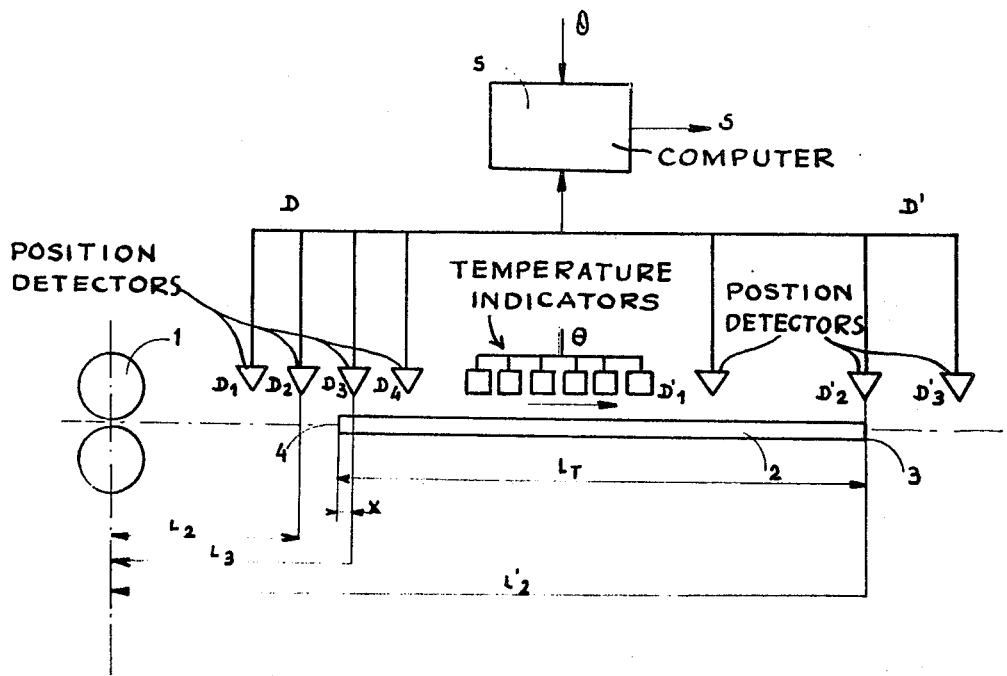
FIG. 1 shows diagrammatically the bar to be measured on leaving the rolling mill.

Referring to FIG. 1, a rolling mill 1 has just rolled a bar 2 along the travel of which two groups of detectors D, D' are disposed. The first group of detectors, which is disposed nearest to the rolling mill, comprises, for instance, four detectors $D_1$–$D_4$, while the second group of detectors, which is disposed furthest away from the rolling mill, comprises, for instance, three detectors $D'_1$–$D'_3$. The detectors of the first group are equidistant, and the total interval between the detector $D_1$ and the detector $D_4$ corresponds to the largest interval separating two detectors of the second group, for instance, the interval between the detectors $D'_1$ and $D'_2$. The detectors D, D' can be, for instance, photoelectric detectors.

The signals delivered by the detectors, when they detect the passage of a bar end, are sent to a computer device 5 which stores the rank of the detectors D' successively passed by the front end 3 of the bar 2, and the times corresponding to the passage of the rear end 4 of the bar 2 in front of each of the detectors D. In the drawings, $L'_2$ corresponds to the position in relation to the rolling mill 1 of the detector $D'_2$ detecting the passage of the front end 3 of the bar 2, while $L_2$ and $L_3$ correspond to the positions of the detectors $D_2$ and $D_3$ of the first group enclosing the rear end 4 of the bar at the same moment.

Figure 3:
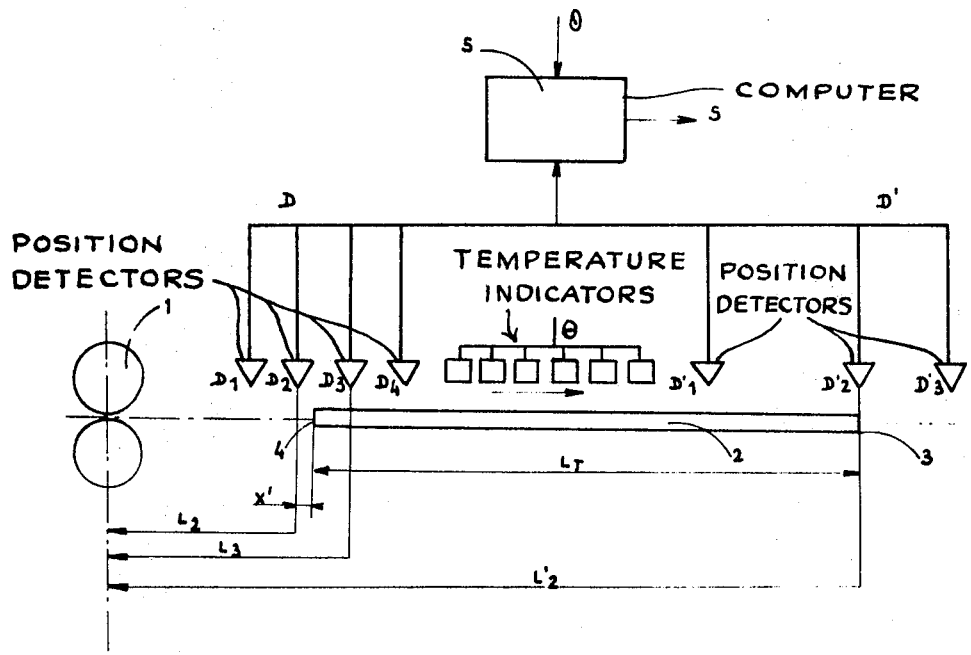
FIG. 3 shows the bar to be measured on leaving the rolling mill in a position in which its rear portion is different from that shown in FIG. 1.

The distance $x$ (FIG. 1) or $x'$ (FIG. 3) corresponds to the distance between the actual position of the rear end 4 of the bar 2 at the moment when the detector $D'_2$ detects the passage of the front end 3 of the bar and the position of the detector of the first group nearest to said rear end ($D_3$ in the case of FIG. 1, and $D_2$ in the case of FIG. 3).

The length $L_T$ of the bar is given by one of the following expressions:

$L_T=L'_2-L_3+x$ (in the case of FIG. 1)

or $L_T=L'_2-L_2-x'$ (in the case of FIG. 3).

The method of operation of the apparatus according to the invention will now be described by way of a nonlimitative example.

The measuring phase starts when the front end 3 of the bar crosses the first detector $D'_1$ of the second group. As the bar advances, the unit 5 stores the rank of the detectors $D'$ of the second group which are successively passed by the front end 3 of the bar.

The measuring phase becomes effective when the rear end 4 of the bar arrives in the zone of the detectors D of the first group. When the rear end of the bar passes the first detector $D_1$ of the first group, this moment is taken as the time origin for determining and storing the times corresponding to the passages of the rear end 4 of the bar in front of each of the detectors of the first group during bar advance; that is to say, for instance: the times $t_1-t_4$.

During the period when the rear portion 4 of the bar is passing in front of the detectors of the first group, the front end of the bar presents itself in front of one of the detectors of the second group, for instance, the detector $D'_2$; at that moment, the unit 5 determines and stores the corresponding time, i.e. $t'_2$.

The unit 5 during this phase therefore has detected: the rank of the detectors of the first and second groups D, D' which have been passed by one or the other end of the bar; the passage times $t_1-t_4$ corresponding to the passages of the rear end 4 of the bar in front of the detectors of the first group; the time of passage $t'_2$ corresponding to the passage of the front end 3 of the bar in front of the detector $D'_2$ of the second group.

The unit 5 then carries out the following calculations: on the one hand, on the basis of the passage times $t_1-t_4$ discovered, the unit calculates: the mean speeds inside the interval formed by two successive detectors of the first group; the momentary speeds found in the axis of the detectors passed of the first group; the changes in speed $\gamma$ and the sign of $\gamma$, in dependence whether the bar is decelerated or accelerated.

On the other hand, the unit 5 decides, in relation to the position occupied by the time $t'_2$ in the interval of time $t_3-t_2$ i.e., in relation to the position occupied by the rear end 4 of the bar in the interval of the two detectors $D_3$ and $D_2$, the method of calculation which will be used to calculate the length of the bar: if the rear end 4 of the bar is nearer the detector $D_3$(FIG. 1) i.e., if:

$t_3-t'_2<(t_3-t_2)/2$ it selects the method of calculating the length of the bar given by the expression $L_T=L'_2-L_3+x$;

On the other hand, if the rear end of the bar is nearer the detector $D_2$(FIG. 3) i.e., if:

$t_3-t'_2 \geq (t_3-t_3)/2$ it selects the method of calculating the length of the bar given by the expression $L_T=L'_2-L_2-x'$.

Figure 2:
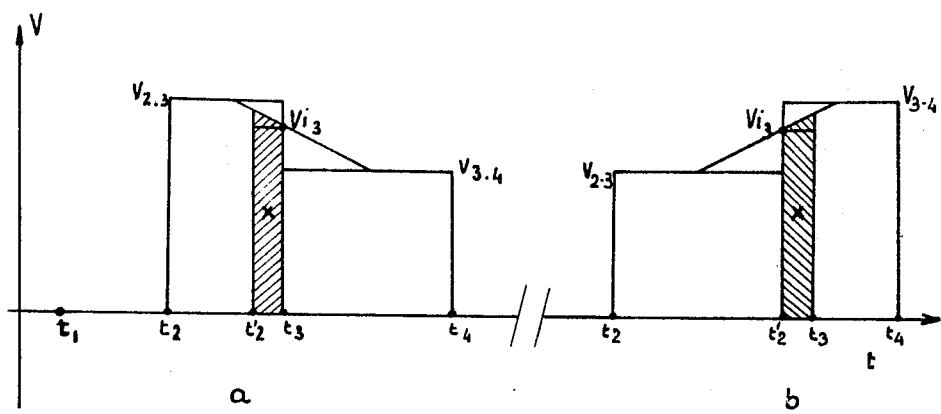
FIG. 2 is a graph showing the development of the speed of the bar in relation to time and with reference to FIG. 1 wherein "$a$" relates to bar deceleration, and "$b$" relates to bar acceleration.

In the first case (FIGS. 1 and 2) the unit 5 calculates the following values from the times elapsing between the passage of the bar ends in front of each of the detectors:

$V_{2,3}$: mean speed in the interval of the detectors $D_2-D_3$
$V_{3,4}$: mean speed in the interval of the detectors $D_3-D_4$
$V_{i3}$: momentary speed found in the axis of the detector $D_3$, given by the formula:

$V_{i3}=(V_{2,3}+V_{3,4})/2$ $\gamma$: calculated over one semi-interval, the value being given by the formula:

$$\gamma=\frac{V_{i3}-V_{2,3}}{\frac{t_3-t'_2}{2}}$$

These values allow the determination of $x$, which has the following expressions:

If the bar is decelerated —i.e., if $V_{i3}<V_{2,3}$:
$x=V_{i3}(t_3-t'_2)+\frac{1}{2}\gamma(t_3-t'_2)^2$;

If the bar is accelerated —i.e., if $V_{i3}>V_{2,3}$:
$x=V_{i3}(t_3-t'_2)-\frac{1}{2}\gamma(t_3-t'_2)^2$.

The unit finally calculates the length of the bar by applying the formula: $L_T=L'_2-L_3+x$.

Figure 4:
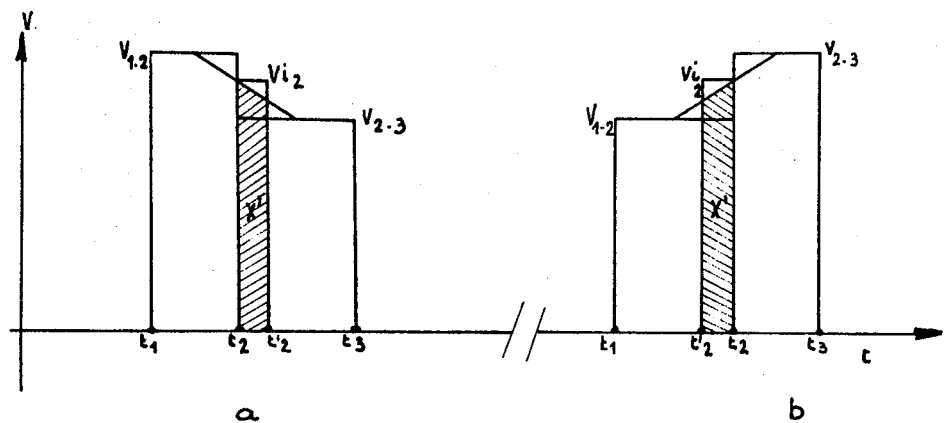
FIG. 4 shows the development of the speed of the bar in relation to time and with reference to FIG. 3, wherein "$a$" relates to bar deceleration, and "$b$" relates to bar acceleration.

In the second case (FIGS. 3 and 4) where:

$t_3-t'_2 \geq (t_3-t_2)/2$ the rear end of the bar is nearer the detector $D_2$; the calculations will therefore be carried out in relation to the detector $D_2$. To this end, and in the same way as in the preceding case, the unit 5 calculates the following values from the data recorded:

$V_{1,2}$: mean speed in the interval of the detectors $D_1-D_2$;
$V_{2,3}$: mean speed in the interval of the detectors $D_2-D_3$;
$V_{i2}$: momentary speed found in the axis of the detector $D_2$ and given by the formula:

$V_{i2}=(V_{1,2}-V_{2,3})/2$

Still in the same way as in the first case, the unit calculates the acceleration $\gamma$ calculated over one-semiinterval:

$$\gamma=\frac{V_{2,3}-V_{i2}}{\frac{t_3-t_2}{2}}$$

which enables $x'$ to be calculated.

$x'$ has as its expression:

If the bar is decelerated—i.e., if $V_{2,3}<V_{i2}$;
$x'=V_{i2}(t'_2-t_2)-\frac{1}{2}\gamma(t'_2-t_2)^2$;

If the bar is accelerated—i.e., if $V_{2,3}>V_{i2}$:
$x'=[V_{i2}(t'_2-t_2)+\frac{1}{2}\gamma(t'_2-t_2)^2$.

Lastly the unit 5 calculates the length of the bar by applying the formula: $L_T=L'_2-L_2-x'$.

The measurement of the length is more precise in proportion as the distance between two successive detectors of the upstream group is smaller. The precision can be as satisfactory as desired. In an embodiment for a rolling mill, the precision was better than 1 in 1,000.

The temperature of the product has been omitted from the preceding calculations, to simplify the formulas. However, sometimes the measurement must be corrected to take into account the temperature of the product, inter alia in the embodiment cited, in which shears are as a rule provided at the outlet from the rolling mill to cut up the bars. To this end, temperature indicators providing output information $\Theta$ are disposed along the path followed by the bars to register the mean temperature thereof and the variation of the temperature during the mean temperature thereof and the variation of the temperature during measurement, and if necessary the mean temperature of the bars as they reach the shears. This information $\Theta$ is introduced into the computer for it to make the necessary calculations in length to enable the shears to be regulated to produce bar sections of a predetermined length at a given temperature, which can be, for instance, ambient temperature. The computer displays at its output S the size of the object for a given reference temperature.

The invention is not limited to the embodiment illustrated, but can be applied to any solid or semisolid product or object of any shape moving in any way over a predetermined path. It is enough to dispose the detectors and if necessary the temperature indicators along the travel followed by the product or object, at suitable places. For instance, the invention can be applied to the glass industry for measuring the size of a piece of glass in the direction of its movement, or in industry producing laminated or agglomerated products, plastics, channel members, etc.

The invention is not limited to any particular type of detector, temperature indicator, store or computer.

We claim:

1. A method of accurately measuring the size of a solid or semisolid object, in the direction of, and during its movement, comprising the steps of:

a. measuring the time taken by the front and rear ends of the object to pass in front of two groups of points placed along its path of movement, one upstream group of close set points and one downstream group of widely spaced points, said points being located so that the distance between the end points of the upstream group corresponds to the largest interval separating two consecutive points of the downstream group, and so that, when the front of the object passes in front of one of the points of the downstream group, the rear of the object simultaneously passes in front of or in the vicinity of one of the points of the upstream group;

b. measuring the temperatures of the object at different points of its path of movement;

c. introducing the preceding measured values into a computer device which calculates the mean speeds at which the rear end of the object passes in front of the close set points from the known values of distances between the said points and from the aforesaid measured times, which also calculates the corresponding accelerations from the average speeds between two consecutive intervals of close set points, and which displays at its output the size of the said object for a given temperature.

2. An apparatus for accurately measuring the size of a solid or semisolid moving object, in the direction of, and during its movement, comprising:

a. two groups of detectors for detecting the passage of the object disposed along its path of movement, an upstream group of close set detectors and a downstream group of widely spaced detectors, said detectors being positioned so that the distance between the end detectors of the upstream group corresponds to the largest interval separating two consecutive detectors of the downstream group, and so that when the front of the object passes in front of one of the detectors of the downstream group, the rear of the object simultaneously passes in front of or in the vicinity of one of the detectors of the upstream group;

b. a computer device responsive to said detectors for recording information concerning the times taken by the front end of the object to pass in front of each of the detectors of the downstream group, and the times taken by the rear end of the object to pass in front of each of the detectors of the upstream group, and for determining from said information the mean speeds of the object in the spaces between two consecutive detectors of the upstream group, and the corresponding algebraic variations in speed of the object; and c. temperature indicators disposed along the path followed by the object for detecting information concerning the means temperature of the object and its variation during measurement, said last-mentioned information being also introduced into the computer device for determining the size of the object for a given temperature.

3. An apparatus as defined in claim 2, wherein said detectors are photoelectric detectors.